(12) United States Patent
Son et al.

(10) Patent No.: US 11,873,788 B2
(45) Date of Patent: Jan. 16, 2024

(54) OPTICAL SENSITIZER DEVICE AND METHOD FOR LOW-ENERGY LASER IGNITION OF PROPELLANTS

(71) Applicant: Purdue Research Foundation, West Lafayette, IN (US)

(72) Inventors: Steven Forrest Son, West Lafayette, IN (US); Kyle Uhlenhake, Lafayette, IN (US); Diane Collard, West Lafayette, IN (US); Mateo Gomez, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/682,026

(22) Filed: Feb. 28, 2022

(65) Prior Publication Data

US 2022/0349373 A1    Nov. 3, 2022

Related U.S. Application Data

(60) Provisional application No. 63/182,017, filed on Apr. 30, 2021.

(51) Int. Cl.
   *F02P 23/04*   (2006.01)
   *F02K 9/95*    (2006.01)
   *B33Y 80/00*   (2015.01)

(52) U.S. Cl.
   CPC ............... *F02P 23/04* (2013.01); *F02K 9/95* (2013.01); *B33Y 80/00* (2014.12)

(58) Field of Classification Search
   CPC .................................................. F02P 23/02
   See application file for complete search history.

(56) References Cited

U.S. PATENT DOCUMENTS

| 3,177,651 | A | 1/1962 | Lawrence |
| 3,685,392 | A | 8/1972 | Platt |
| 4,047,483 | A | 9/1977 | Williams |
| 6,506,889 | B1 | 1/2003 | Han et al. |
| 10,858,296 | B1* | 12/2020 | Myrick .................. C06B 45/04 |
| 2014/0227548 | A1* | 8/2014 | Myrick ..................... C10L 1/28 |
| | | | 203/40 |

(Continued)

OTHER PUBLICATIONS

Uhlenhake, K. E. et al., "Laser ignition of solid propellants using energetic nAl-PVDF optical sensitizers," Combust. Flame, vol. 254, p. 112848, 2023, doi: 10.1016/j.combustflame.2023.112848.

(Continued)

*Primary Examiner* — John Kwon
(74) *Attorney, Agent, or Firm* — Purdue Research Foundation

(57) ABSTRACT

An igniter system and method for igniting a propellant by an optical energy source. The igniter system including an igniter composite and a propellant. The igniter composite including a reactive component and a fluoropolymer. The propellant is coupled to the igniter composite. The igniter composite has a composition including nano-aluminum at ideal stoichiometry in polyvinylidene fluoride. The igniter composite is configured to achieve a sustained ignition from a wavelength emitted from the optical energy source. The wavelength is between around 250 nanometers to around 1100 nanometers.

16 Claims, 13 Drawing Sheets

(56) References Cited

U.S. PATENT DOCUMENTS

2022/0349373 A1* 11/2022 Son .................. F02P 23/04

OTHER PUBLICATIONS

Collard, D. N. et al., "Flash and laser ignition of Al/PVDF films and additively manufactured igniters for solid propellant," Combust. Flame, vol. 244, p. 112252, 2022, doi: 10.1016/j.combustflame. 2022.112252.

Uhlenhake, K. E. et al., "Photoflash and Laser Ignition of Full Density Nano-Aluminum PVDF Films," Combust. Flame, vol. 233, No. 111570, 2021, doi: https://doi.org/10.1016/j.combustflame.2021. 111570.

Örnek M. et al., "Preparation and characterization of multifunctional piezoenergetic polyvinylidene fluoride/aluminum nanocomposite films," J. Appl. Phys., vol. 131, No. 5, 2022, doi: 10.1063/5. 0076258.

Uhlenhake, K. E., "On the Use of Fluorine-Containing Nano-Aluminum Composite Particles to Tailor Composite Solid Rocket Propellants," Propellants, Explos. Pyrotech., vol. 47, No. 10.1002, 2022.

Collard, D. N. et al., "Tailoring the reactivity of printable Al/PVDF filament," Combust. Flame, vol. 223, pp. 110-117, 2021, doi: 10.1016/j.combustflame.2020.09.016.

Collard, D. N. et al., "Solid propellant with embedded additively manufactured reactive components," AIAA Propuls. Energy Forum Expo. 2019, No. Aug., pp. 1-9, 2019, doi: 10.2514/6.2019-4443.

Messer, D. K. et al., "Effects of flexoelectric and piezoelectric properties on the impact-driven ignition sensitivity of P (VDF-TrFE )/ nAl films," vol. 242, 2022, doi: 10.1016/j.combustflame.2022. 112181.

Fleck, T.J. et al., "Additive manufacturing of multifunctional reactive materials," Addit. Manuf., 17 (2017) 176-182, 2017, doi: 10.1016/j.addma.2017.08.008.

* cited by examiner (a)

OPTICAL SENSITIZER DEVICE AND METHOD FOR LOW-ENERGY LASER IGNITION OF PROPELLANTS

CROSS REFERENCE TO RELATED APPLICATIONS

This application claims the benefit of U.S. Provisional Application Ser. No. 63/182,017, filed on Apr. 30, 2021. The entire disclosure of the above application is hereby incorporated herein by reference.

GOVERNMENT RIGHTS

This invention was made with government support under FA9550-19-1-0008 awarded by the Air Force Office of Scientific Research (AFOSR) and under DGE-1333468 awarded by the National Science Foundation Graduate Research Fellowship Program. The government has certain rights in the invention.

FIELD

The present disclosure relates to igniter systems and, more particularly, to propulsion igniter systems.

INTRODUCTION

This section provides background information related to the present disclosure which is not necessarily prior art.

Solid propellants are employed in a wide range of applications from the inflation of airbags to propulsion systems for rockets. The ignition of solid propellants must be carefully controlled and modified on a per-use basis due to the specific ignition requirements of each application. Pyrotechnics, propulsion, and munitions all have unique requirements for safe and reliable ignition. Although each application may have specific requirements, the propellant should have a high density, a small ignition delay, and consistent and controlled ignition. Optical ignition is of interest as it can potentially reduce the input energy needed for ignition while providing more spatial and temporal control and improved safety by eliminating the electrical systems used in pyrogens and bridge wires, thereby militating against stray electrical charges.

Optical ignition can be classified into two categories: broadband irradiation, characteristic of flash ignition, and coherent, single wavelength energy, characteristic of laser ignition. Nanoscale metal particles, carbon nanotubes, high-nitrogen materials, and thin films of nano-porous silicon are known to ignite with a broadband light source. Known methods of flash ignition have been successful with loose powders or low-density materials. However, loose powders or low-density materials are difficult to integrate into practical energetic systems. Specifically, it is challenging to adhere a loose powder to a propellant; and low-density composites consume more volume and may not have robust mechanical integrity.

Laser ignition of solid propellants is a compelling alternative to known electrical ignition systems because laser ignition systems may enable more precise spatial and temporal control over the ignition process. Laser ignition systems may also be implemented into practical energetic systems more easily due to their higher energy output capabilities compared to broadband light sources. However, the sensitivity of energetic materials to energy flux from a laser can lead to a variety of problems during ignition. For example, double-base nitrocellulose propellants require a critical and narrow window of flux intensity, an "ignition corridor," for self-sustained ignition. Below the critical energy level, the propellant will not ignite. Above, the reaction can be overdriven, where the surface burns faster than it would in normal deflagration experiments. Thus, when the input laser energy is removed quickly, the burning propellant surface quickly drops in burning rate and, in some cases, is unable to recover to a steady burning rate resulting in extinguishment. Similar regimes of ignition were found in aluminized ammonium perchlorate (AP) composite propellant. Weber et al., Radiative ignition and extinction dynamics of energetic solids, J. Thermophys. Heat Transf. 19 (2005) 257-265, studied this effect computationally and compared the results to cyclotetramethylene-tetranitramine (HMX), and concluded that sustained laser ignition of propellants is achieved by satisfying two conditions: (1) the surface must reach a critical activation temperature for condensed phase surface decomposition, and (2) the thermal profile, or pre-heat zone of the propellant, must be able to recover to non-radiation augmented conditions when the laser input is removed. The thermal profile of the propellant is largely tied to condensed-phase heat transfer and chemical processes, so the time of laser radiation, as well as how fast the laser radiation is removed, can both have an effect. This was confirmed experimentally by Ali et al., High-irradiance laser ignition of explosives, Combust. Sci. Technol. 175 (2003) 1551-1571, who applied the dual ignition criteria model (DICM) to predict the ignition energy needed for HMX to within ten percent of measured values, which requires both a critical temperature and energy deposition approximately equal to the thermal energy in preheat zone in a steadily burning propellant. Other important parameters for ignition delay include pressure, the absorptivity of the propellant, and material formulation.

Both ignition delay control and self-sustained ignition are crucial for practical propellant systems. A possible solution for consistent laser ignition is the use of an absorptive coating or by adding photosensitive particles to the propellant to reach critical surface temperatures more rapidly. Carbon black, carbon nanotubes, high nitrogen materials, and nanometal particles have been identified for their sensitivity to laser ignition, although with varying degrees of success. Carbon black has been used extensively to increase the absorptivity of propellants at the surface. When used as a coating or additive, carbon black has improved ignition in a range of wavelengths from 500-1064 nm. Additionally, carbon black has been used to reduce ignition thresholds and delays in secondary explosives. However, the use of carbon black is limited in energetic materials due to its typical small particle size, which can lead to increased porosity and agglomeration. Furthermore, carbon black is a relatively inert material, resulting in decreased energetic performance. Switching to energetic sensitizers raises issues of absorptivity, as energetic materials are rarely absorptive to wavelengths below infrared. Many energetic materials may be ignited using high-powered carbon dioxide lasers operating with wavelengths in the range of 10.6 μm, but these wavelengths are often not practical for energetic applications. Using lower energy lasers operating at wavelengths from ranges of 200-1200 nm generally requires loose powder or porous materials, similar to flash ignition, and these materials are unable to achieve sustained ignition when the laser radiation is removed. Sustained ignition may be understood as when a stable flame is maintained for at least five seconds.

Sustained ignition is often difficult to achieve in propellants due to a lack of optical absorptivity at convenient wavelengths.

There is a continuing need for a low-energy ignition system that is capable of achieving a consistent and sustained ignition of a propellant. Desirably, the absorptivity of the low-energy ignition system may enable the use of a laser ignition source.

SUMMARY

In concordance with the instant disclosure, an igniter system configured to be ignited by an optical energy source that is capable of achieving a consistent and sustained ignition of a propellant, has been surprisingly discovered.

In one embodiment, an igniter system configured to be ignited by an optical energy source includes an igniter composite and a propellant. The igniter composite may include a reactive component and a fluoropolymer. The propellant may be coupled to the igniter composite. In a specific example, the optical energy source may be a laser source and/or an incoherent (e.g., flash-lamp) source. The igniter composite may be configured to achieve a sustained ignition from a wavelength emitted from the optical energy source. The wavelength may be between around 250 nanometers to around 1100 nanometers. In certain circumstances, the igniter composite may be formed as a layer disposed on the propellant. In a specific example, the igniter composite may be formed as a first layer disposed on a second layer. In a more specific example, the first layer may include smaller particles of the igniter composite in comparison to the particles of the igniter composite within the second layer. In an alternative example, the igniter composite may be formed as composite pellets which may then be disposed within and/or substantially throughout the propellant.

In another embodiment, the present technology includes methods of using the igniter system. For instance, a first method of manufacturing the igniter system may include providing an igniter composite including a reactive component and a fluoropolymer. The igniter composite may be configured to achieve a sustained ignition from a wavelength emitted from the optical energy source. The wavelength may be between around 250 nanometers to around 1100 nanometers. The first method may also include a step of providing a propellant. The igniter composite may then be coupled to the propellant.

In certain circumstances, the igniter system may be used according to a second method. The second method may include providing the igniter system including a propellant and an igniter composite. The igniter composite further including a reactive component and a fluoropolymer. The propellant may be coupled to the igniter composite. The igniter composite may be configured to achieve a sustained ignition from a wavelength emitted from the optical energy source. The wavelength may be between around 250 nanometers to around 1100 nanometers. Next, the second method may include applying a form of optical energy from the optical energy source to the igniter system. Then, the igniter composite may be ignited. The second method may include another step of igniting the propellant.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 1 is a schematic diagram of an igniter system, further depicting an igniter composite as a single first composite layer having a first reactive component and a first fluoropolymer, according to one embodiment of the present disclosure;

FIG. 2 is a schematic diagram of the igniter system, further depicting the first composite layer having the first reactive component and the first fluoropolymer, and a second composite layer having a second reactive component and a second fluoropolymer, wherein the first reactive component is different from the second reactive component, and the first fluoropolymer is different from the second fluoropolymer, according to one embodiment of the present disclosure;

FIG. 3 is a schematic diagram of the igniter system, further depicting the first composite layer having the first reactive component and the first fluoropolymer, and the second composite layer having the second reactive component and the second fluoropolymer, wherein the first reactive component is the same as the second reactive component, and the first fluoropolymer is the same as the second fluoropolymer, according to one embodiment of the present disclosure;

Figure 23:
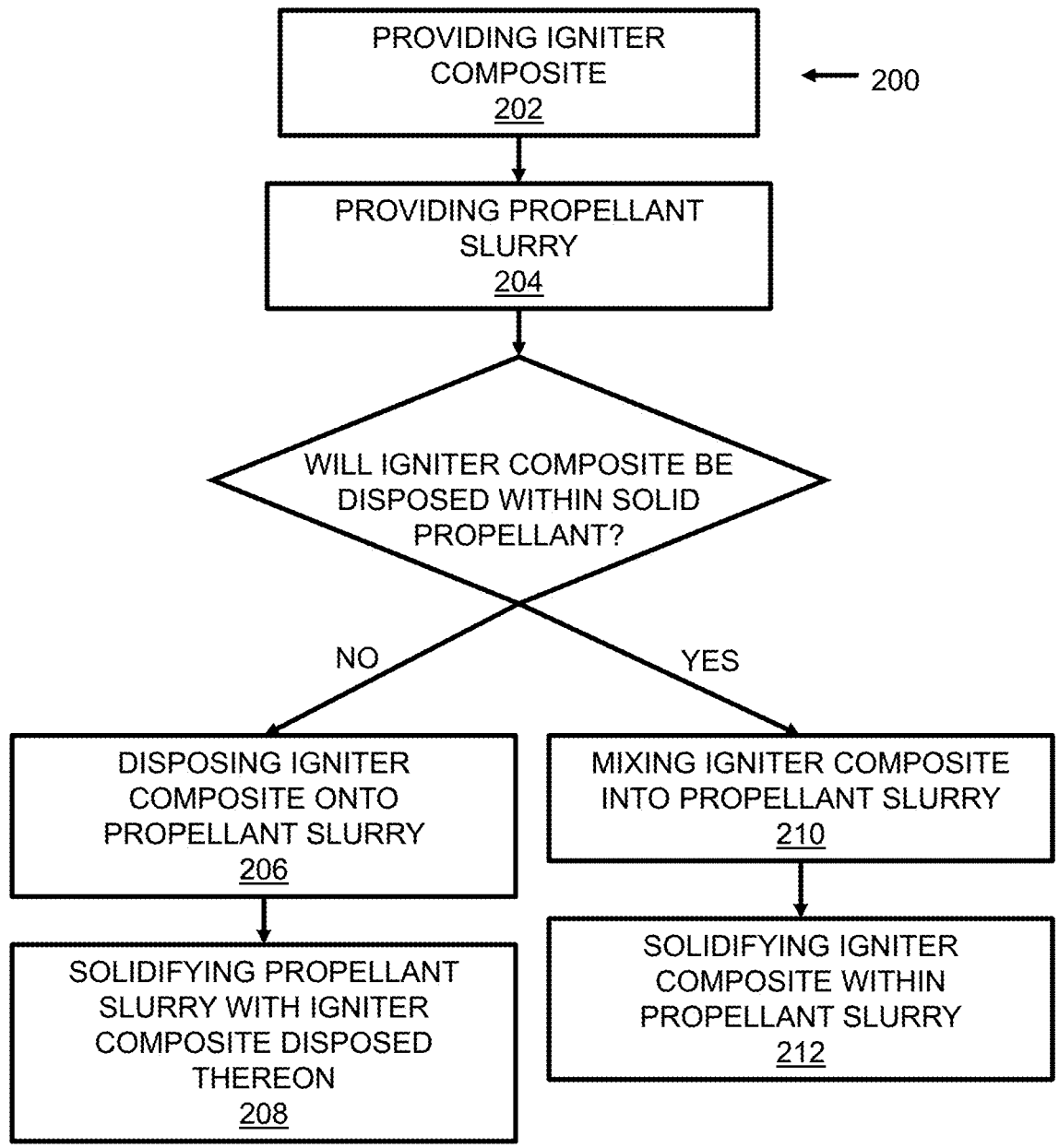
Figure 24:
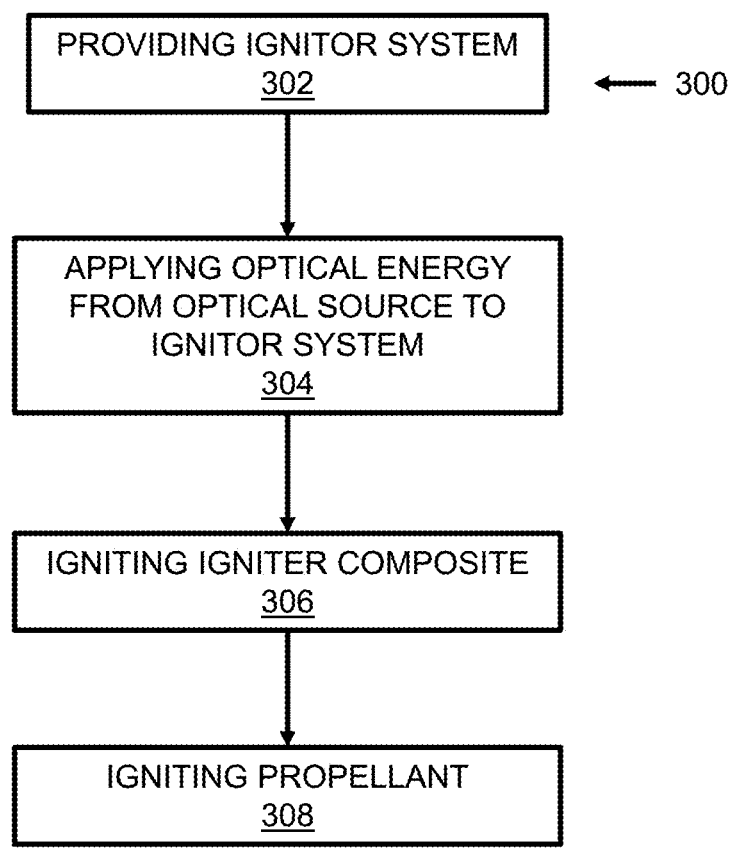

FIG. 23 is a flowchart of a first method for manufacturing the igniter system, further depicting a decision if the igniter composite will be disposed on the propellant or if the igniter composite will be disposed within the igniter composite, according to one embodiment of the present disclosure; and FIG. 24 is a flowchart of a second method for using the igniter system, according to one embodiment of the present disclosure.

DETAILED DESCRIPTION

The following description of the technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature unless otherwise disclosed, and thus, the order of the steps can be different in various embodiments, including where certain steps can be simultaneously performed.

I. Definitions

Unless otherwise defined, all technical terms used herein have the same meaning as commonly understood by one of ordinary skill in the art to which the present disclosure pertains.

As used herein, the terms "a" and "an" indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "sustained ignition" refers to when a desired material for ignition continues to burn after the input energy is removed. Sustained ignition may also be understood as where the reaction was not interrupted and/or did not necessitate a secondary initiation.

As used herein, the term "ignition delay" refers to the time from first light on the igniter to the observation of steady flame propagation across the propellant.

As used herein, the term "wt. %" refers to weight percent, which is the amount of a specified substance in a unit amount of another substance.

As used herein, the term "µAl" refers to micron-scale aluminum.

As used herein, the term "nAl" refers to nano-scale aluminum.

As used herein, the term "Al/PVDF igniter material" refers to a particular aluminum/polyvinylidene fluoride composition used in a specific embodiment of an igniter composite.

As used herein, the term "laser" refers to a device that generates an intense beam of coherent monochromatic light (or other electromagnetic radiation) by stimulated emission of photons from excited atoms or molecules.

As used herein, the term "incoherent" refers to a type of source that emits light with frequent and random changes of phase between the photons.

In the present disclosure the terms "about" and "around" may allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

II. Description

As shown in FIGS. 1-7, an igniter system 100 configured to be ignited by an optical energy source 102 includes an igniter composite 104, 106 and a propellant 108. The igniter composite 104, 106 may include a reactive component 110, 112 and a fluoropolymer 114, 116. In certain circumstances, the propellant 108 may be constructed from a propellant slurry and thereafter formed into a solid form of the propellant 108. The propellant 108 may be coupled to the igniter composite 104, 106. The igniter composite 104, 106 may be configured to achieve a sustained ignition from a wavelength emitted from the optical energy source 102. The wavelength may be between around 250 nanometers to around 1100 nanometers. In a specific example, the optical energy source 102 may be one of a laser source and/or an incoherent (e.g., flash-lamp) source. In another specific example, the igniter composite 104, 106 may be configured to achieve the sustained ignition with less than five joules per square centimeter of energy provided by the optical energy source 102. In an even more specific example, the igniter composite 104, 106 may be configured to achieve the sustained ignition with less than seven tenths of a joule per square centimeter of energy provided by the optical energy source 102. The igniter system 100 may also be configured to achieve the sustained ignition with a wavelength from the optical energy source of around 250 nanometers to around 1100 nanometers. More specifically, the igniters system 100 may achieve the sustained ignition with a laser wavelength of around 1064 nanometers and/or around 532 nanometers. Advantageously, the igniter composite 104, 106 of the igniter system 100 may be configured to reduce the overall weight of the igniter system 100 and militate against electrical risks of traditional initiators, thereby resulting in more efficient and reliable solid rocket motor ignition systems. Desirably, the igniter system 100 may provide enhanced spatial and temporal control over the ignition process.

The igniter composite 104, 106 may include various components and have certain functions. For instance, the reactive component 110, 112 of the igniter composite 104, 106 may include photoreactive materials and/or energetic materials as a source of ignition for the propellant 108. The reactive component 110, 112 may include at least one of a reactive metal and a metal oxide. More specifically, the reactive component 110, 112 may include lithium, boron, sodium, magnesium, aluminum, silicon, calcium, titanium, vanadium, chromium, manganese, iron, cobalt, nickel, copper, zinc, gallium, yttrium, zirconium, niobium, molybdenum, ruthenium, rhodium, palladium, silver, cadmium, indium, tin, antimony, iodine, cesium, barium, hafnium, tantalum, tungsten, platinum, gold, mercury, lead, bismuth, any oxides of the metals, and/or any combination thereof. In an even more specific example, the reactive component may be aluminum. Advantageously, the present disclosure demonstrates the tunability of the ignition delay and propagation properties of optically-sensitive, nearly full density reactive aluminum/polyvinylidene fluoride (Al/PVDF) films and additively manufactured igniter composites 104. A skilled artisan may select other suitable reactive components, within the scope of the present disclosure.

The fluoropolymer 114, 116 may include various components and have certain functions. For instance, the fluoropolymer 114, 116 may include PVF (polyvinylfluoride), PVDF (polyvinylidene fluoride), PTFE (polytetrafluoroethylene), PCTFE (polychlorotrifluoroethylene), PFA (perfluoroalkoxy polymer), [P(VDF-TrFE)] (poly(vinylidene fluoride-trifluoroethylene)), [P(VDF-TrFE-CFE)] (poly(vinylidene fluoride-trifluoroethylene-chlorofluoroethylene)), THV (a polymer of tetrafluoroethylene, hexafluoropropylene and vinylidene fluoride), FEP (fluorinated ethylene-propylene), ETFE (polyethylenetetrafluoroethylene), HTE (a polymer of hexafluoropropylene, tetrafluoroethylene and ethylene), ECTFE (polyethylenechlorotrifluoroethylene), FFPM/FFKM (Perfluorinated Elastomer), FPM/FKM (Fluorocarbon [Chlorotrifluoroethylenevinylidene fluoride]), FEPM (Fluoroelastomer [Tetrafluoroethylene-Propylene]), PFPE (Perfluoropolyether), PFSA (Perfluorosulfonic acid), and any combination thereof. In a specific example, the fluoropolymer 114, 116 may be PVDF. One skilled in the art may select other suitable fluoropolymers, within the scope of the present disclosure.

Figure 1:
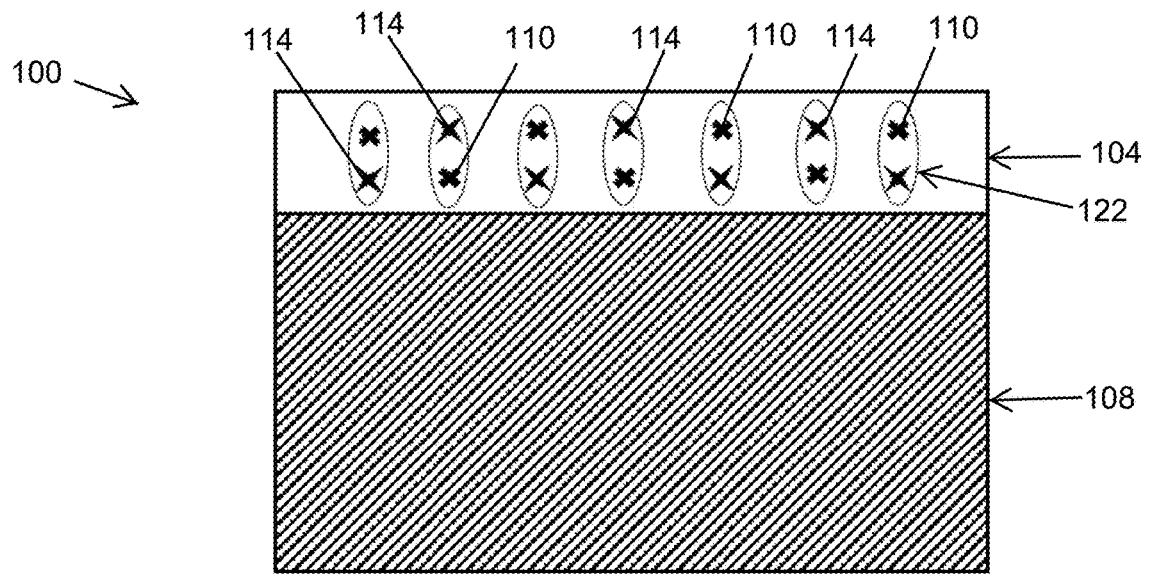
Figure 2:
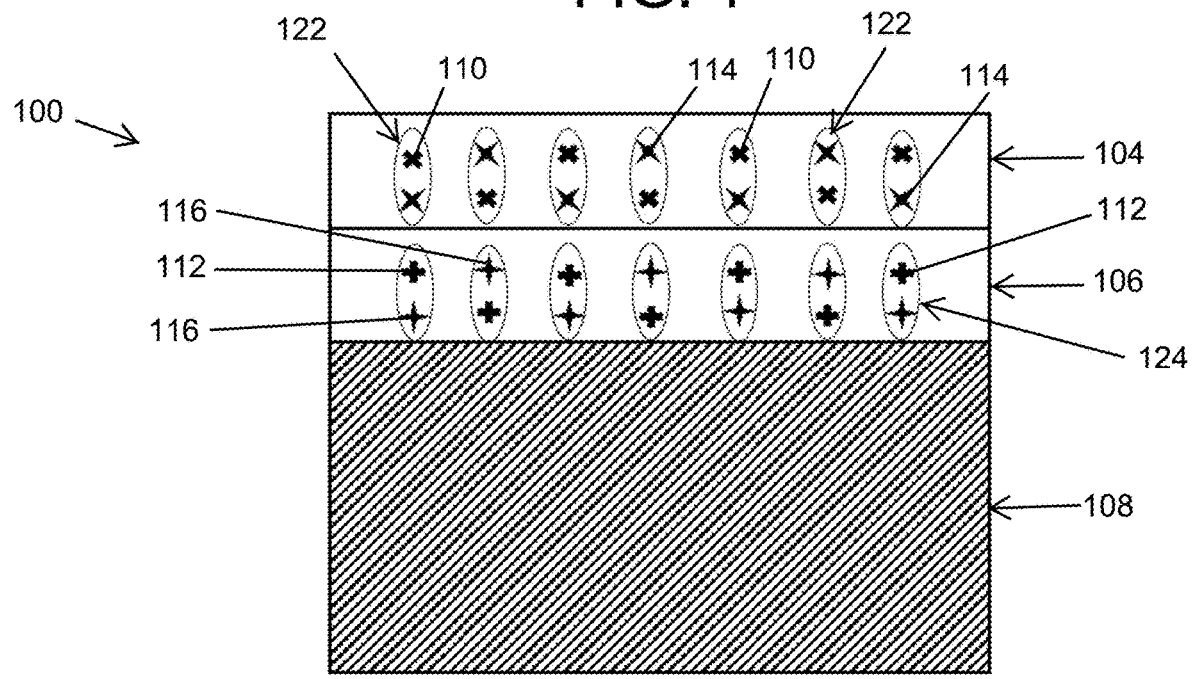
Figure 3:
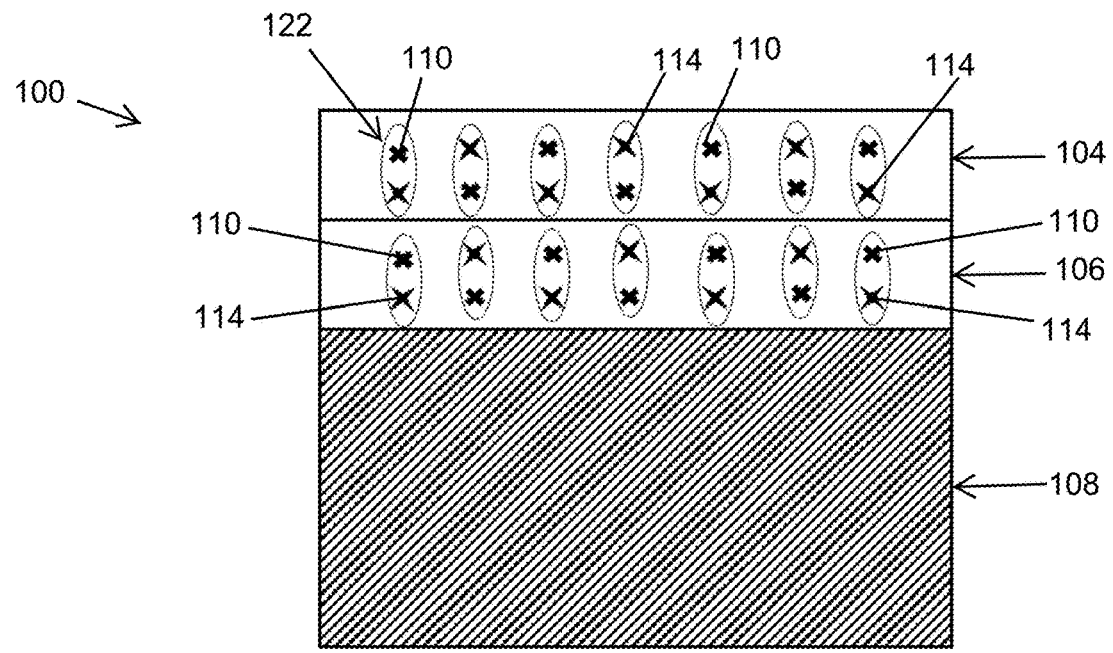
Figure 4:
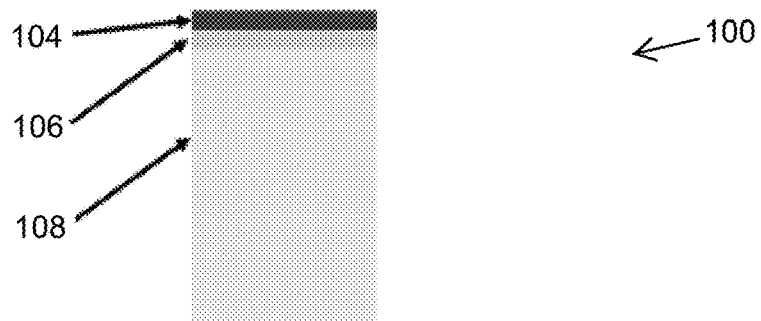
FIG. 4 is a schematic diagram of the igniter system, further depicting the igniter composite as a first composite layer and a second composite layer disposed on a propellant, according to one embodiment of the present disclosure.

In certain circumstances, the igniter composite 104, 106 may be formed as a composite layer 118, 120 disposed on the propellant 108, as shown in FIG. 1. The igniter composite 104, 106 formed as a composite layer 118, 120 may include a nearly full-density photosensitive reactive component 110, 112. In a particular embodiment, the igniter composite 104, 106 may include nano-aluminum (nAl) at ideal stoichiometry in polyvinylidene fluoride (PVDF). The composition of nAl/PVDF provides a full-density igniter composite 104, 106 that retains its flash ignition capabilities, due to the PVDF binder isolating the nAl particles and the pre-ignition reactions between nAl and the fluoropolymer 114, 116. As shown in FIG. 1, a single first composite layer 118 of nAl/PVDF igniter composite 104, 106 was found to flash ignite but frequently yielded delayed transitions in steady propagation from the igniter composite 104, 106 to the propellant 106. To improve the continuity and steadiness of the transition, fuel particle size, igniter thickness, and a combination of layers 118, 120 of nAl and µAl in PVDF were investigated. In a specific example, the reactive component 110, 112 may include a first reactive component 110 and a second reactive component 112. The first reactive component 110 and the second reactive component 112 may be the same material, as shown in FIG. 3, or they may be different materials, as shown in FIG. 2. The fluoropolymer 114, 116 may include a first fluoropolymer 114 and a second fluoropolymer 116. The first fluoropolymer 114 and the second fluoropolymer 116 may be the same material, as shown in FIG. 3, or they may be different materials, as shown in FIG. 2. The igniter composite 104, 106 may include a first composite layer 118 and a second composite layer 120. The first composite layer 118 may have a first composite layer particle 122 including the first reactive component 110 and the first fluoropolymer 114. The second composite layer 120 may include a second composite layer particle 124 including the second reactive component 112 and the second fluoropolymer 116. As shown in FIGS. 2-4, the second composite layer 120 may be disposed between the first composite layer 118 and the propellant 108. In a more specific example, the first composite particle 122 of the first composite layer 118 may be smaller particles in comparison to the second composite particles 124 of the second composite layer 120. For instance, the first composite layer particle 112 may be a substantially nano-sized particle. The second composite layer particle 124 may be a substantially micro-sized particle. The total thickness of the first composite layer 118 and/or the second composite layer 120 may be between at least five-hundredths of a millimeter to around five-tenths of a millimeter. In an even more specific example, the first composite layer 118 of nAl may be used to flash ignite the igniter composite 104, 106. The ignition of the first composite layer 118 may then propagate to the second composite layer 120 of µAl without delay. In other words, the first composite layer 118 may be configured as an optically sensitive layer that has a higher reaction rate and is configured to be ignited from an optical energy source. The second composite layer 120 may be configured to have a lower reaction rate and may be less optically sensitive in comparison to the first composite layer 118, which enhances the second composite layer 120 ability to ignite the propellant 108. It should be appreciated the first composite layer 118 and the second composite layer 120 may each further include a plurality layers. For instance, where the igniter composite 104, 106 is cast onto strands of ammonium perchlorate composite propellant, continuous ignition may be achieved with a single first composite layer 118 of nAl printed atop a plurality of second composite layers 120 of µAl for a flash-activated propellant and/or a laser-activated propellant. In a specific example, the plurality of layers within each of the first composite layer 118 and/or the second composite layer 120 may be between at least five-hundredths of a millimeter to around five-tenths of a millimeter. Without being bound to any particular theory, the nAl/PVDF first composite layer 118 is believed to enable good flash and/or laser ignition sensitivity. Further, the µAl/PVDF second composite layer 120 is believed to produce a more sustained heat transfer to thereby produce a more reliable ignition process. The igniter composite 104, 106 may be coupled to the propellant 108 through various ways. For instance, the igniter composite 104, 106 may be initially constructed via tape casting as a film. The igniter composite 104, 106 may also be formed through additive manufacturing/3D printing. In a specific example, the igniter composite 104, 106 may be initially constructed separately from the propellant 108 via tape casting and/or 3D printing, and thereafter coupled to the propellant 108 during a propellant curing process. The propellant curing process may include solidifying a slurry with a liquid binder to form the propellant 108. Advantageously, 3D printing the igniter composite 104, 106 may provide more precise control over the geometry and thickness of the igniter composite 104, 106. In an alternative embodiment, the igniter composite 104 may be disposed within the slurry mixture during the propellant curing process so that igniter composite 104 will then be disposed within the propellant 108. Desirably, providing the igniter composite 104 within the propellant 108 may enhance the efficiency of manufacturing the igniter system 100.

Figure 5:
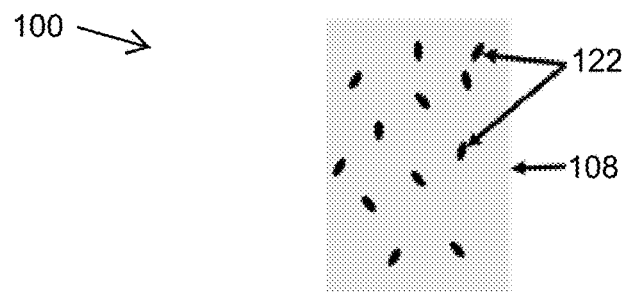
FIG. 5 is a schematic diagram of the igniter system, further depicting the igniter composite as a particle disposed in the propellant, according to one embodiment of the present disclosure.

With continued reference to the alternative embodiment, as shown in FIG. 5, an optically sensitive igniter composite 104, 106 material with a higher reaction rate may be used directly as an additive in the propellant 108 to enable optical ignition. The igniter composite 104, 106 may be formed as the first composite particle 122 which may then be disposed within the propellant 108. In a specific example, the first composite particle 122 may be shaped as a composite pellet. The composite pellet may also be provided as a nano-sized first composite particle 122 disposed in the propellant 108. The nano-sized first composite particle 122 may include thirty weight percent (wt. %) to fifty wt. % of the reactive component 110, 112. In certain circumstances, the first composite particle 122 may include nAl/PVDF as the optically sensitive reactive component 110, 112. In a more specific example, the first composite particle 122 may comprise around forty wt. % nAl. The first composite particle 122 may be less than one millimeter in diameter. In a more specific example, ammonium perchlorate (AP)/hydroxyl-terminated polybutadiene (HTPB) composite propellant 108 is optically sensitized by adding the energetic nAl/PVDF first composite particles 122, which may lead to enhanced sustained ignition with relatively low radiative energy levels (<5 J/cm2). With continued reference to the more specific example, the nAl/PVDF propellant 108 was compared to a neat AP/HTPB propellant having a carbon black additive and also compared to a propellant with a nano-aluminum (nAl) additive without PVDF. Only the nAl/PVDF propellant 108 exhibited sustained ignition. The nAl/PVDF first composite particles 122 were characterized using optical imaging and ranged from 600 to 1000 µm. The ignition delays of the propellant 108 with nAl/PVDF additives ranged from 1.8 ms to 4.5 ms, depending on the energy density of the laser 102. These optically sensitive additives offer improved ignition for propellants and exhibit sustained burning over a wide range of laser energies. The use of nAl/PVDF as the optically sensitive igniter composite 104, 106 within a first composite particle 122 may enable the optical ignition of the propellant 108 without the use of any layered igniter, thereby enabling the propellant 108 to be ignited directly from an optical energy source 102. Advantageously, the first composite particle 122 does not require the use of a second layer and/or a material with a lower reaction rate which simplifies the ignition process of propellants 108 even further.

In another embodiment, the present technology includes methods of using the igniter system 100. For instance, as shown in FIG. 23, a first method 200 of manufacturing the igniter system 100 may include providing an igniter composite 104, 106 including a reactive component 110, 112 and a fluoropolymer 114, 116. The igniter composite 104, 106 may be configured to achieve a sustained ignition a wavelength between around 250 nanometers to around 1100 nanometers from an optical energy source 102. The first method 200 may also include a step 204 of providing a propellant 108 as a propellant slurry. The igniter composite 104, 106 may then be coupled to the propellant slurry. In certain circumstances, a decision may be made if the igniter composite will be disposed within the propellant or if the igniter composite will be disposed on the propellant. In a specific example, the igniter composite 104, 106 may be manufactured utilizing additive manufacturing and/or tape-casting and may thereafter be disposed on the propellant slurry during a propellant curing process. Then, the propellant slurry may be solidified with the igniter composite 104, 106 disposed thereon. In an alternative example, the igniter composite 104, 106 may be coupled to the propellant 108 by disposing the igniter composite 104, 106 within the propellant slurry. For instance, the igniter composite 104, 106 may be provided as a first composite particle 122 and the first composite particle 122 may be disposed within the propellant slurry. In a more specific example, a plurality of first composite particles 122 may be disposed randomly and/or substantially evenly throughout the propellant slurry. The method 200 may then further include a step 212 of solidifying the first composite particle(s) 122 of the igniter composite 104, 106 within the propellant slurry.

In certain circumstances, the igniter system 100 may be used according to a second method 300, as shown in FIG. 30. The second method 300 may include providing the igniter system 100 including a propellant 108 and an igniter composite 104, 106 including a reactive component 110, 112 and a fluoropolymer 114, 116. The propellant 108 may be coupled to the igniter composite 104, 106. The igniter composite 104, 106 may be configured to achieve a sustained ignition from a wavelength emitted from the optical energy source 102. The wavelength may be between around 250 nanometers to around 1100 nanometers. Next, the second method 300 may include applying a form of radiative energy from the optical energy source 102 to igniter system 100. Then, the igniter composite 104, 106 may be ignited. The second method 300 may include another step 308 of igniting the propellant 108.

III. Example

Provided as non-limiting examples, FIGS. 8-22 illustrate various specific examples of the igniter system 100. For instance, thin films of igniter composite 104, 106 having around twenty percent weight Al/PVDF were prepared with nAl and µAl fuel. Nine formulations of the igniter composite 104, 106 films were made by varying the active nAl (80 nm nominal diameter, 70% active content, Novacentrix) content in the fuel by 12.5 wt. % with the remaining fuel consisting of µAl (3 µm, Valimet H-3). Powdered PVDF (Kynar 711, Arkema) was dissolved in dimethylformamide (DMF) at a solvent ratio of 6:1 mL per gram of PVDF. Aluminum was added to DMF then ultrasonically mixed using a BRANSON DIGITAL SONIFIER® for three minutes before adding PVDF and following with a second mixing cycle. The solution was cast into thin films using an MIT Corporation MSK-AFA-HC100™ tape caster with a heated bed held at 125° C. to ensure full-density igniter composite 104, 106 films. The igniter composite 104, 106 films were dried on the heated bed for fifteen minutes before removing and drying for several hours at ambient conditions. The microstructure of the tape cast films was observed using scanning electron microscopy (SEM), more particularly an FEI Nova Nano-SEM® at an operating energy of 5 kV. The samples were coated with a 20 nm layer of platinum (Pt) using a CRESSINGTON™ sputter coater.

Seven structures of igniter systems 100 were fabricated for ignition delay testing on propellants 108: two tape-cast and five printed formulations. The igniter composite 104, 106 formulations had an active content of 20 wt. % aluminum in PVDF which was determined to be close to stoichiometric. The tape-cast films consisted of pure nAl and a mixture of nAl and µAl fuel in which 75 wt. % of the fuel content was nAl and 25 wt. % µAl (0.75 nAl film), resulting in thicknesses between 20-30 µm. Printed igniter formulations included a single first layer 118 nAl (1 nAl), a five-stacked first layer 118 nAl (5 nAl), a single first layer 118 nAl on top of a single second layer 120 of µAl (1 nAl×1 µAl), a single first layer 118 nAl on top of three second layers 120 of µAl (1 nAl×3 µAl) and a single second layer 120 nAl and µAl mixture (0.75 nAl).

Printable filament material was printed into 1 cm×1 cm igniters through fused-filament fabrication (FFF) with a print speed of 10 mm/s and layer height of 0.125 µm. The filament was passed through an extruder head heated to 240° C. and deposited onto a heated build plate maintained at 70° C. with a BUILDTAK® 3D Printing Surface supplemented by a layer of glue, such as ELYMER'S™ All Purpose Glue.

The igniter composite 104, 106 was cast onto the propellant 108 comprising of 85 wt. % AP with a 4:1 coarse (60-130 µm, Firefox) to fine (20 µm, ATK) ratio and 15 wt. % binder. The binder consisted of 76.33 wt. % hydroxyl-terminated polybutadiene (R45-M HTPB, Rocket Motor Components), 15.05% isodecyl pelargonate plasticizer (Rocket Motor Components), and 8.62% isophorone diisocyanate curing agent (Firefox). Batches of 35 g were prepared with an initial hand mixing followed by two cycles on a LABRAM® RESODYN® resonant mixer for three minutes at 80 g under vacuum. The propellant 108 was cast into a polytetrafluoroethylene mold with dimensions of 2.54 cm×7.62 cm×0.64 cm with one side exposed. The igniter composite 104, 106 was disposed on top of the propellant 108 with the exposed top nAl first composite layer 118 then covered. The mold was compressed until the propellant 108 no longer pushed through overflow holes. No intermediate adhesive was needed to hold the igniter composite 104, 106 in place as the cured propellant 108 secured the igniter composite 104, 106 in place directly. In this specific example, a minimum of ten propellant 108 samples were fabricated for each igniter composite 104, 106 formulation.

Flash testing of the nAl and µAl mixture films was conducted using a White Lightning X3200™ broadband xenon flash lamp commercially available through Paul C. Buff Inc. The films were cut into 1 cm×1 cm squares and placed in front of the flash bulb at a set distance. Due to the scattering of the broadband light, the deposited energy was controlled by distance, up to a maximum of 2 cm. The flash lamp was then triggered, and ignition of the films was selectively observed. The placement of each sample was determined using Neyer's Sensitivity Test. A minimum of 30 samples were tested to determine the minimum ignition energy (MIE) resulting in a 50% probability of ignition with a two-sided confidence interval of 95%. These tests were then repeated for nAl printed igniter composites 104, 106 of the same dimensions.

Figure 6:
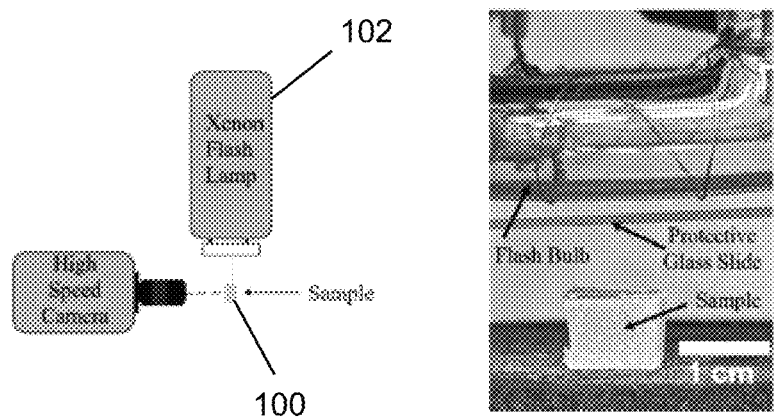
FIG. 6 is a schematic diagram of the flash-activated setup for igniting and analyzing the igniter system sample, according to one embodiment of the present disclosure.
Figure 7:
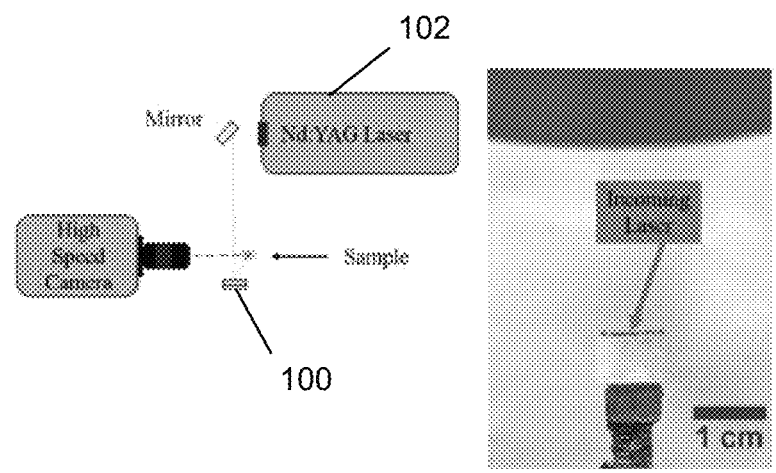
FIG. 7 is a schematic diagram of the laser-activated setup for igniting and analyzing the igniter system sample, according to one embodiment of the present disclosure.

As shown in FIGS. 6-7, a similar test setup was utilized for flash and laser ignition of the propellants 108. As shown in FIG. 6, the propellants 108 were placed below the flash lamp 102 with the igniter composite 104, 106 facing the xenon flash bulb 102 or the laser 102. A thin glass slide was placed between the propellant 108 and the flash bulb 102 to protect the flash bulb 102 from the high temperatures of the propellant flame. The flash lamp 102 was then triggered and the resulting ignition was captured at 2500 fps with a PHANTOM™ v2012 high-speed camera. The incident flash energy was roughly 7 J/cm2. Likewise, tests were then repeated with a laser system 102, as shown in FIG. 7, to observe ignition from a highly focused heating source without the need of a protective glass slide. The samples were ignited with a Nd:YAG laser 102 operating at a wavelength of 1064 nm and energy of 7 J/cm2 fired in a pulse burst mode with a 5 ms burst, 10 ns pulses, and a repetition rate of 100 kHz. These settings roughly match the temporal profile of the flash bulb.

Surface roughness measurements were obtained on films and 3D printed materials using an ALPHA-STEP® D-600 profilometer. The profilometer was able to detect changes in surface height on the scale of nanometers and produce profile traces of the materials. These profile traces were used to capture general roughness and surface features to compare the films to the printed materials that would be exposed to the optical energy input.

The igniter composite 104, 106 needs to consistently initiate the propagation of the energetic material in the propellant 108 to achieve sustained ignition. Dimming, quenching, and unsteady transitions are undesirable as they lead to increased variability in performance. The second primary factor is the delay between initiation and ignition of the energetic material. To characterize the Al/PVDF film and printed igniter composites 104, 106, the minimum ignition energy (MIE), ignition delay, and consistency of transition from the igniter composite 104, 106 to an AP composite propellant 108 were quantified.

Figure 8:
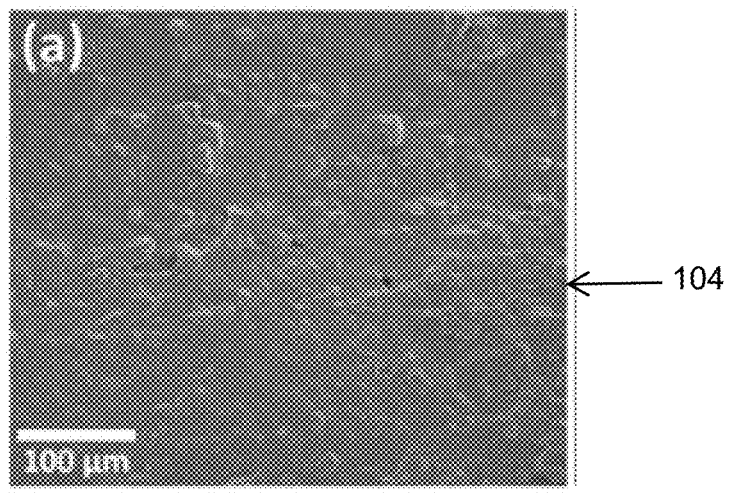
FIG. 8 is a microscopic image of the single first composite layer having a printed nano-scale aluminum (nAl) composition, according to one embodiment of the present disclosure.
Figure 9:
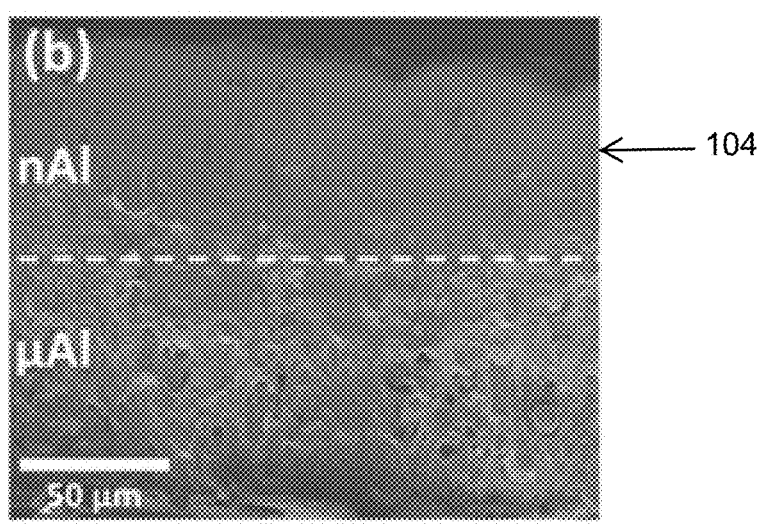
FIG. 9 is a microscopic image of the first composite layer having a printed nAl composition and a second composite layer having a printed micron-scale aluminum ($\mu$Al) composition, according to one embodiment of the present disclosure.

Printed igniter composites 104, 106 with layers of nAl and µAl were examined with SEM to investigate the surface and internal structure of the samples. As shown in FIG. 8, the surface of the printed nAl igniter composite 104, 106 had a higher roughness than the tape-cast films of the same formulation. To examine a dual-layer cross-section, the igniter composites 104, 106 were cut with a razor blade. As shown in FIG. 9, the nAl and µAl layers were identifiable by the microstructure. In the layer of µAl, Al particles can be seen displaced from their original positions due to the blade cut, and the tracks left during the displacement were not indicative of porosity before the cut.

Figure 10:
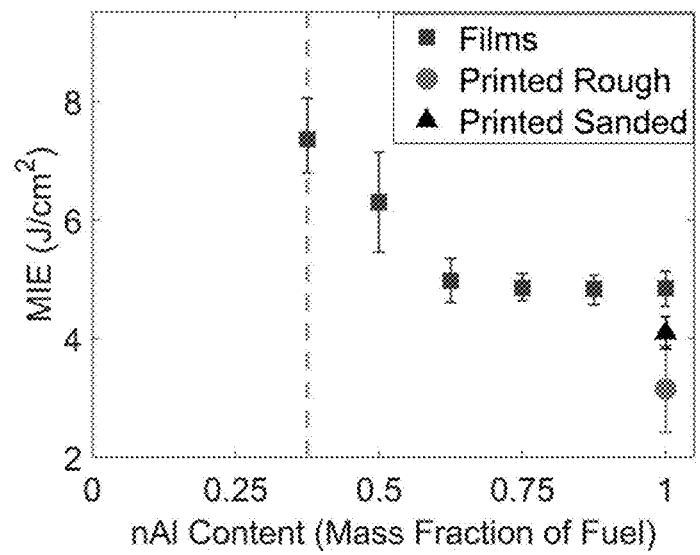
FIG. 10 is an interval plot illustrating a minimum ignition energy (MIE) of igniter composites that were printed and tape-casted at varying concentrations of nAl and $\mu$Al, further depicting a dashed line to indicate the minimum nAl content necessary, according to one embodiment of the present disclosure.

As shown in FIG. 10, the effect of Al size on flash ignition can be seen. There are two key thresholds for flash ignition: the minimum mass fraction of nAl needed to flash ignite and the asymptotic decline of MIE as nAl increased. This is believed to be caused by the interaction of light energy in the film being scattering-dominated with µAl but absorption-dominated with nAl, and a critical amount of energy must be absorbed for the igniter composite 104, 106 to ignite. Below a mass fraction of 0.375 nAl, the flash setup was unable to ignite any films, as too little energy was absorbed by the nAl. Utilizing a flash bulb with a higher energy level or different flash duration are contemplated to provide the energy needed for ignition below this setup-limited threshold. At a mass fraction 0.625 nAl, the MIE dropped to ~5 J/cm2 and remained essentially constant as the nAl mass fraction increased. The variability also decreased for 0.625 nAl and above. That is, although ignition was observed reliably at a nAl mass fraction of 0.375 and 0.50, these samples had higher MIE and variability. However, once the nAl mass fraction reached 0.625, the highly absorptive nAl particles dominated the interaction with the light energy. While there was still some µAl, the light scattering did not hinder the absorption and the MIE remained constant. Additionally, the MIE for the 1 nAl printed igniter was significantly lower than films of the same composition.

Figure 11:
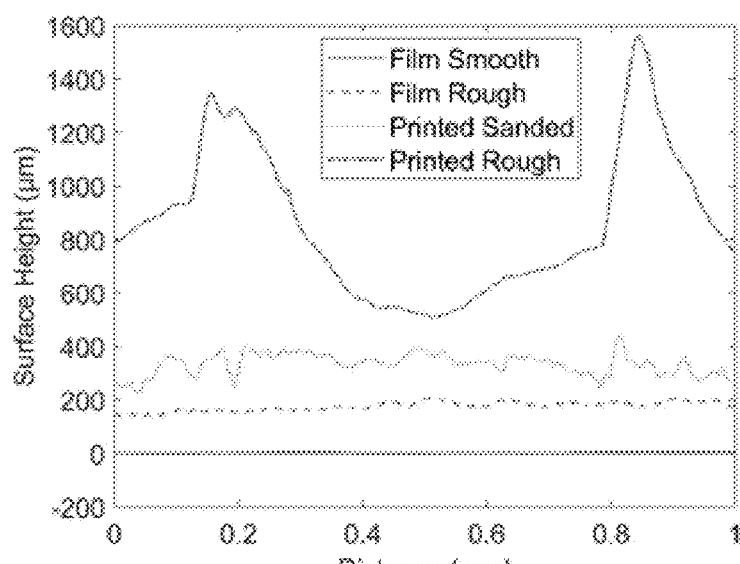
FIG. 11 is a line graph illustrating profilometer measurements obtained from the igniter composites that were printed and tape-casted with varying surface roughness, according to one embodiment of the present disclosure.
Figure 12:
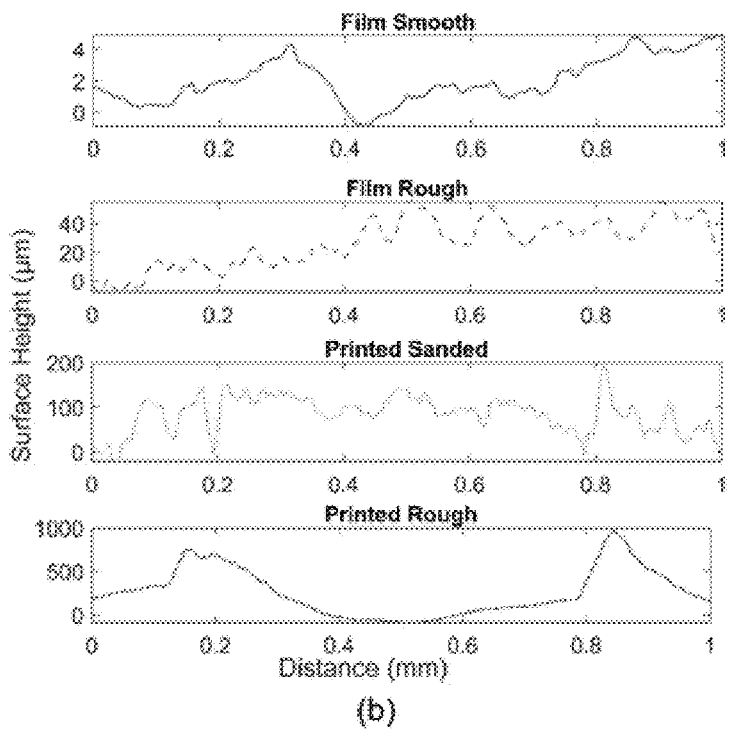
FIG. 12 is the line graph, as shown in FIG. 11, illustrating the individual profilometer measurements, further depicting the larger amplitude variations in surface height correspond to lower MIE and that no significant difference in MIE was observed between the rough sides and the smooth sides of the nAl tape-casted films, according to one embodiment of the present disclosure.

The surface roughness of the igniter composite 104, 106 was discovered to affect the sensitivity to optical ignition. The process of tape-casting nAl igniter composite 104, 106 samples produced two surface finishes: the side of the film exposed to air produced a relatively rough surface, while the side of the film touching the glass plate produced a smooth surface. Additionally, printed Al/PVDF igniter composite 104, 106 samples had a rougher surface with higher-amplitude surface variation than the films. A printed Al/PVDF igniter composite 104, 106 sample was carefully sanded with 240 grit sandpaper to create smoother features and all four of these surfaces were measured using a profilometer. Higher amplitude surface height variations, as shown in FIGS. 11-12, corresponded with the lowered MIE shown in FIG. 10. Likewise, this can also be seen with the rough printed samples. The rough printed samples had a visibly rough surface and the highest-amplitude peaks in the surface height due to the prescribed print lines and nozzle limitations. The high-amplitude variation had a two-fold effect that led to increased sensitivity. The high peaks created a blackbody effect as light reflected from the sample had a higher chance of colliding with another peak in the surface, globally increasing the amount of energy absorbed by the surface and lowering the MIE. Secondly, the high peaks formed corners in which the heat from the absorbing sides may not be conducted away as fast into the bulk of the sample, similar to a propellant 108 corner/edge burning effect, forming hotspots that led to ignition requiring less input energy than a flatter surface. To test whether the amplitude of the surface variations was the primary driver decreasing the MIE, the printed igniter composite 104, 106 samples were sanded with 180 grit sandpaper to eliminate the large peaks. Sanded printed igniter composite 104, 106 samples exhibited surface height variations and MIE between that of the rough printed and the rough films. The rough and smooth sides of the films showed no significant differences in MIE despite the overall increase in surface roughness in the rough films, reinforcing the observation that the higher-amplitude variation of a surface can lead to an increased absorption of reflected light and/or hotspot formation.

The Al/PVDF igniter composite 104, 106 commonly exhibited three modes of transition when igniting AP composite propellant 108: 1) continuous (prompt) ignition, 2) delayed ignition, and 3) extinguishment (failure to ignite). A continuous ignition is characterized by a steady propagation of the igniter material to a steady self-propagating reaction of the propellant 108 pellet. Specifically, a minimal delay is observed between first light of the igniter composite 104, 106 and full ignition of the propellant 108. A delayed ignition is typified by a diminished reaction between the igniter composite 104, 106 before recovery to steady propellant propagation, as indicated by a drop in light emission before recovering across the propellant 108 pellet. Extinguishment is characterized as the consumption of the igniter composite 104, 106 but unsuccessful ignition of the propellant 108 pellet.

Figure 13:
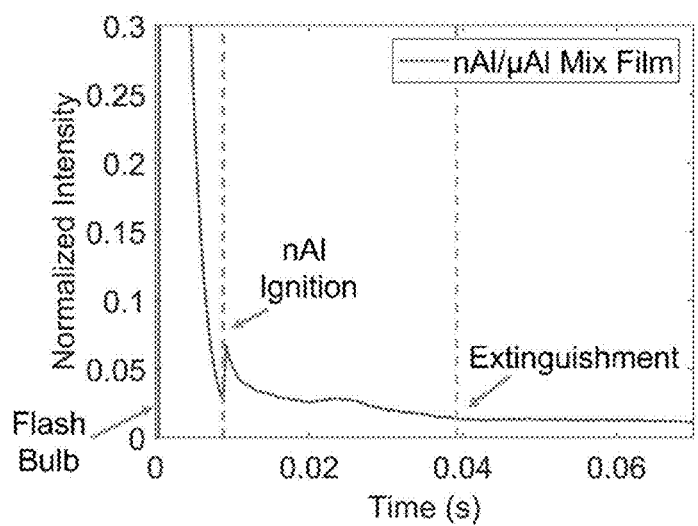
FIG. 13 is a line graph illustrating an intensity trace of a flash ignited propellant sample exhibiting extinguishment, according to one embodiment of the present disclosure.

The aluminized igniter composite 104, 106 material burned brighter and had a different flame structure than that of the AP propellant 108 flames. This visual difference made the identification of the quality of the ignition between the igniter composite 104, 106 and propellant 108 possible, both visually and through the quantification of light intensity. The manner of transfer—continuous ignition, delayed ignition, or extinguishment—could also be clearly visualized in both the image frames and with the intensity traces. When igniting a sample with a broadband flash lamp, the bulb was exposed, leading to a saturation or near saturation of the field of view. This was manifested in an initial spike of saturation, as shown in FIG. 13. In all of the ignition events with the flash lamp, the igniter composite 104, 106 began to react as the flash intensity decreased, making quantification of the delay between triggering the flash and the first light on the igniter material difficult. Ignition of the igniter composite 104, 106 material was thus defined as the time at which the intensity had fallen to 10% of the highest value of the first peak (flash). Similarly, the first light of the propellant 108 ignition appeared as the igniter composite 104, 106 material was consumed and was thus demarcated as the time at which the intensity had fallen to 10% of the highest value of the second peak (igniter peak). After the second peak (igniter peak), the intensity trace would either continue at a steady value, which indicated continuous or prompt ignition, decrease in value before rising to an asymptotic steady state, which indicated a delayed ignition, or fall to near zero, which indicated extinguishment.

With continued reference to FIG. 13, all of the propellants 108 with film igniters resulted in extinguishment and failed to ignite the propellant 108, as the film was consumed too quickly for sufficient energy to transfer into the propellant 108 for a continued propagating reaction. As described by Ali et al., High-irradiance laser ignition of explosives, Combust. Sci. Technol. 175 (2003) 1551-1571, in order to see sustained ignition and satisfy the dual ignition criteria model (DICM), the material must reach a critical surface temperature and deposited energy. While the nAl/PVDF film burned at a high enough temperature, the reaction was too fast in this configuration to satisfy the critical energy criteria in the AP composite propellant 108. The burning rate of nAl/PVDF and the limited thickness of 20-30 µm in the films resulted in insufficient time for the AP composite propellant 108 to reach the critical energy threshold needed to ignite.

Figure 14:
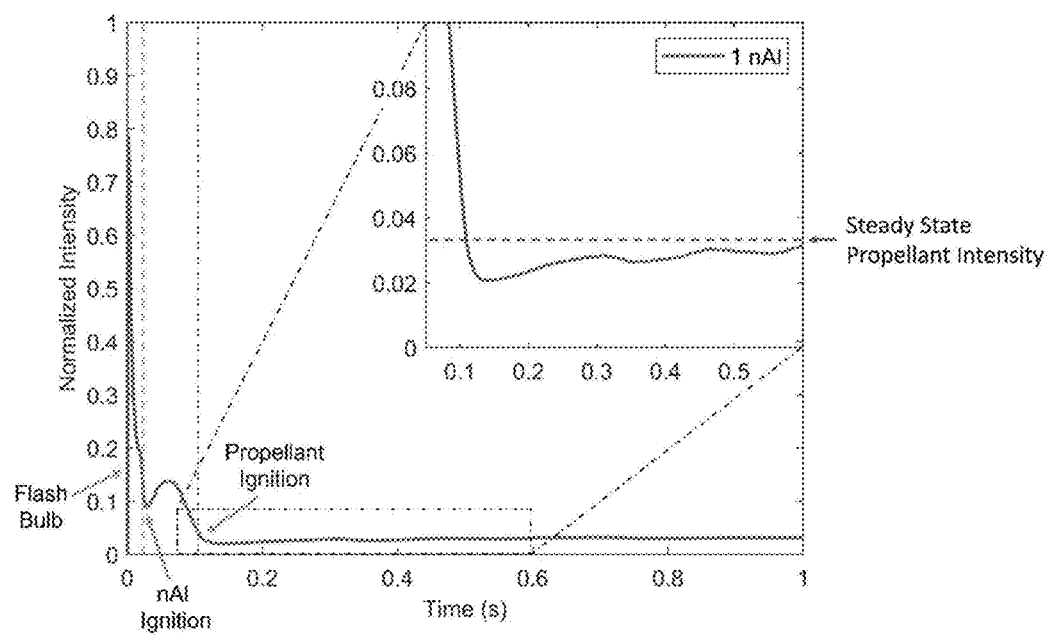
FIG. 14 is a line graph illustrating an intensity trace of a flash ignited propellant sample exhibiting delayed ignition, according to one embodiment of the present disclosure.
Figure 15:
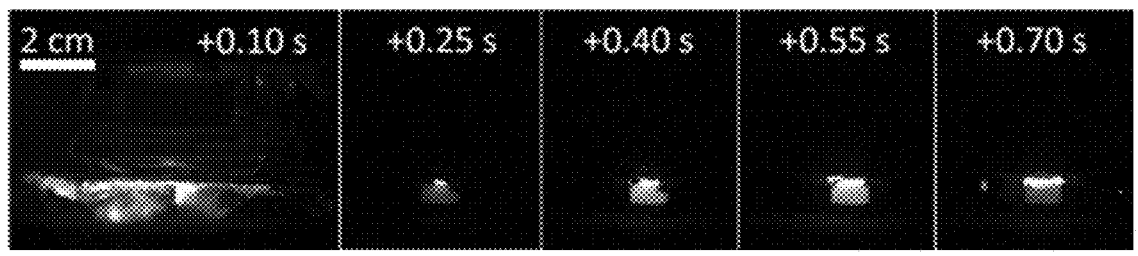
FIG. 15 is a time progression of images depicting a printed nAl igniter exhibiting delayed ignition, according to one embodiment of the present disclosure.

As shown in FIG. 14, there was a delayed ignition between the igniter composite 104, 106 and the propellant 108 pellet. This occurred in many of the igniter composites 104, 106 having only nAl layers. With continued reference to FIG. 14, a decrease of nearly 46% below the steady-state intensity value occurred after the second peak, during the transition from the igniter composite 104, 106 material to the propellant 108, before rising to an asymptote indicating a steady-state reaction had been achieved across the propellant 108. As shown in FIG. 15, this corresponded with a visibly noticeable dimming in the corresponding image frames.

Figure 16:
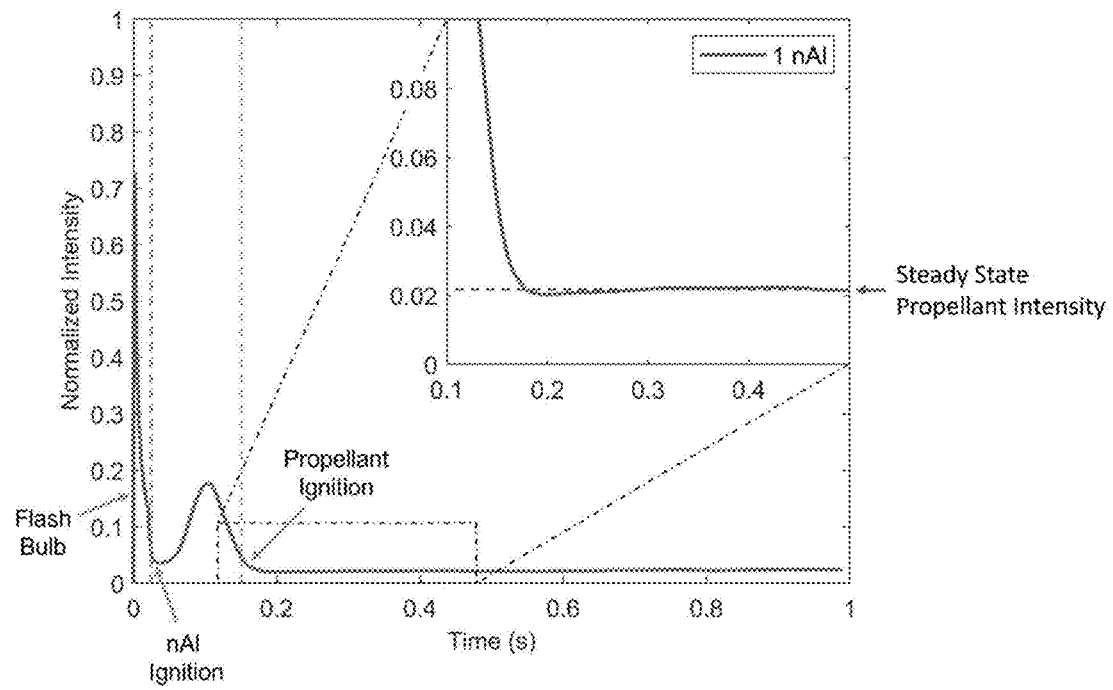
FIG. 16 is a line graph illustrating an intensity trace of a flash ignited propellant sample exhibiting continuous ignition, according to one embodiment of the present disclosure.
Figure 17:
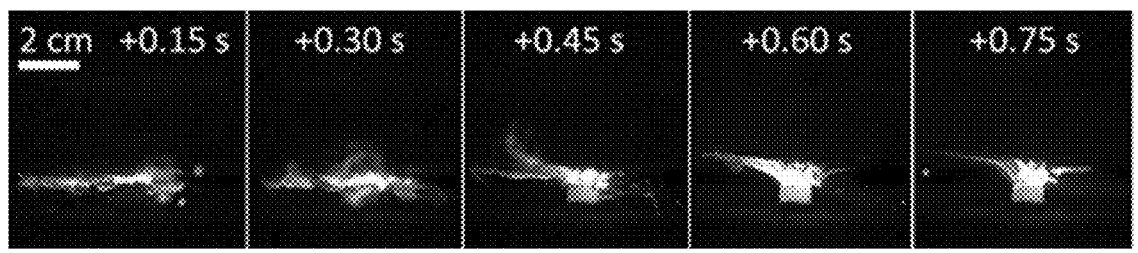
FIG. 17 is a time progression of images depicting a printed igniter composite exhibiting continuous ignition, according to one embodiment of the present disclosure.

To address the need for the reliable production of a continuous ignition from the reaction of the nAl layer to steady flame propagation in the propellant 108, a layer of µAl was added below the nAl. Without being bound to any particular theory, it is believed formulations of µAl react slower than nAl; however, it is also believed µAl is not as flash ignitable compared to nAl. This slower burning layer µAl increases the time of the reaction and reduces the burning rate mismatch between the nAl layer and AP composite propellant 108, therefore satisfying the critical energy criteria to ignite the AP composite propellant 108. A first composite layer 118 of nAl enhances the initiation the reaction. A single first composite layer 118 of nAl exhibited continuous ignition into the second composite layer 120 of µAl beneath the first composite layer 118. On average, igniter systems 100 with a combination of nAl and µAl layers 118, 120 were found to have an increased number of samples with continuous ignition of the propellant 108 pellet as compared to the igniter systems 100 with only nAl layers 118. In contrast to the delayed ignition, continuous ignition did not exhibit a significant undershoot as the intensity between the igniter composite 104, 106 material and the propellant 108 approached the steady-state propellant intensity, as shown in FIGS. 16-17.

Figure 18:
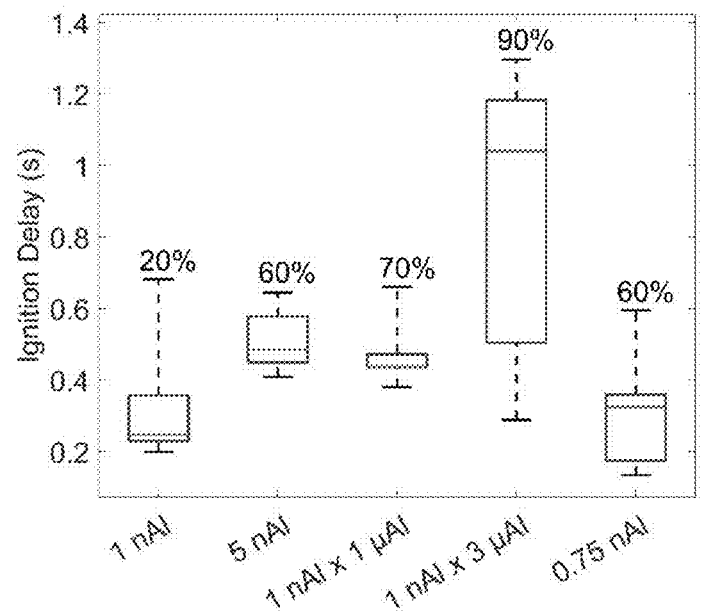
FIG. 18 is an interval plot illustrating a total ignition delay of flash-ignited printed igniter composites, further depicting a percentage of continuous ignition occurrences for each sample, according to one embodiment of the present disclosure.

Ultimately, the layered 1 nAl×1 µAl igniter system 100 performed similarly to the 5 nAl igniter system 100, as shown in FIG. 18, with a similar number of samples exhibiting delayed ignition between the igniter composite 104, 106 material and propellant 108. Increasing the number of µAl second composite layers 120 resulted in a longer total ignition delay than the 1 nAl×1 µAl igniter system 100 as more material had to be consumed before reaching the propellant 108 pellet. The 1 nAl×3 µAl igniter system 100 samples had more consistent continuous ignition, but also had the largest average and variance of total ignition delay of the formulations tested. Only one igniter system 100 sample of 1 nAl×3 µAl exhibited a delayed ignition of the propellant 108.

With continued reference to FIG. 18, the printed igniter composites 104, 106 consisting of 1 nAl and 5 nAl exhibited a delayed ignition of the propellant for 20% and 60% of the samples, respectively. The increased thickness of the 5 nAl resulted in a higher average total ignition delay than the 1 nAl (0.51 s and 0.31 s, respectively); however, the 5 nAl igniters led to more samples exhibiting continuous ignition. A single layer igniter composite 104, 106 with a mixture of nano- and micro-scale fuel, such as 75 wt. % nAl, was also investigated to improve the consistency of the ignition but was found to exhibit a similar percentage of continuous ignition samples as the 5 nAl with a reduced total ignition delay time. This indicated that the speed of reaction may not be solely responsible for determining the quality of the transition between the igniter composite 104, 106 material and the propellant 108.

The total ignition delays in Table 1 are associated with the time from first light on the igniter composite 104, 106 material to the recovery of steady reaction across the propellant 108 pellet, as determined by the intensity traces. Manual verification of the total ignition delays led to an error associated with each test based on the visual identification of the range of frames involving the first signs of AP propellant flames across the entire surface to the consumption of any lingering Al/PVDF. The associated error per test increased with the addition of μAl layers due to the occasional lingering of burning tendrils of Al/PVDF on the surface of the propellant 108.

TABLE 1

Flash ignition delays and propagation modes.

| Igniter Setup | Total Ignition Delay (s) Average | Std Dev | Associated Error per Test (s) | % Continuous Ignition |
|---|---|---|---|---|
| 1 nAl | 0.33 | 0.18 | 0.01 | 20% |
| 5 nAl | 0.51 | 0.08 | 0.02 | 60% |
| 1 nAl × 1 μAl | 0.47 | 0.09 | 0.03 | 70% |
| 1 nAl × 3 μAl | 1.04 | 0.30 | 0.03 | 90% |
| 1 nAl/μAl Mix | 0.36 | 0.13 | 0.03 | 60% |
| nAl/μAl Mix Film | No Propellant Ignition | | | 0% |
| nAl Film | No Propellant Ignition | | | 0% |

As nAl reacts rapidly, the soot formed locally around the aluminum is blown apart into smaller solid fragments, whereas μAl typically exhibits soot formation in long, connected strands. As a protective glass slide had to be placed close to the igniter composites 104, 106, there was concern that the glass may be inhibiting the propellant 108 by obstructing the release of soot from the reaction zone. To investigate if the protective slides were inhibiting the reactions and creating the delayed ignition between the igniter composite 104, 106 and the propellant 108, ignition delay tests were repeated with a laser setup 102.

Figure 19:
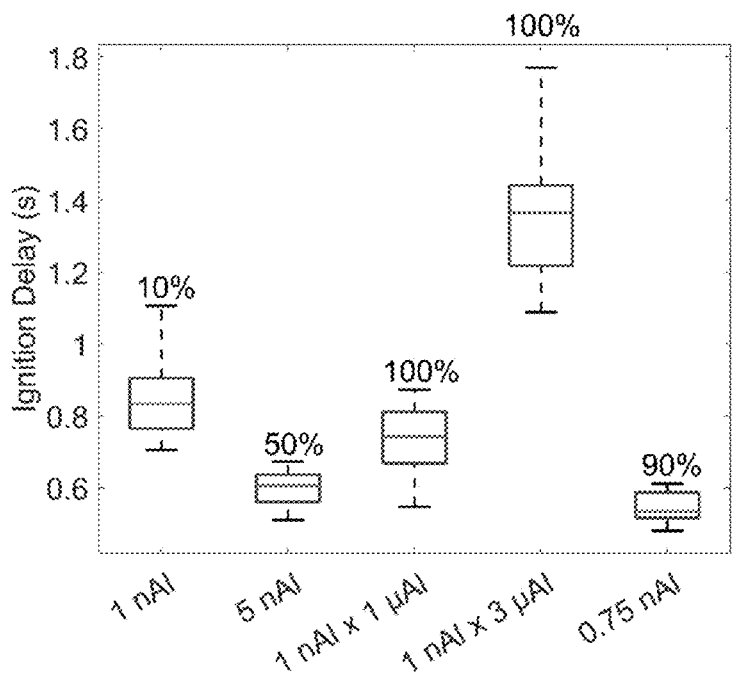
FIG. 19 is an interval plot illustrating a laser ignition delay of printed igniter composites, further depicting a percentage of continuous ignition occurrences for each sample, according to one embodiment of the present disclosure.

The laser 102 was capable of driving ignition at energies higher than the MIE of the Al/PVDF igniter composite 104, 106 materials. For instance, for nAl films, the MIE was found to be 0.7 J/cm2 when using the 1064 nm laser. The optical setup removed the necessity of a protective glass slide altogether. If the delayed ignition in the flash-ignited propellants were solely caused by an inhibition of reaction by the glass slide, the laser materials were hypothesized to have no samples with delayed ignition. Some laser-ignited films such as the 1 nAl×1 μAl, the 1 nAl×3 μAl, and the 75 wt. % nAl printed igniters had more samples with continuous ignition, as shown in FIG. 19, when compared to the flash-ignited samples, as shown in FIG. 18. However, other laser-ignited films such as the 1 nAl and 5 nAl printed igniters did not show enhanced continuous ignition, indicating that the glass slide was not responsible for the delayed ignition. Rather, it is believed this is due to the higher energies used to initiate the reaction as the energy deposited by the flash lamps was capped at 7 J/cm2.

Figure 20:
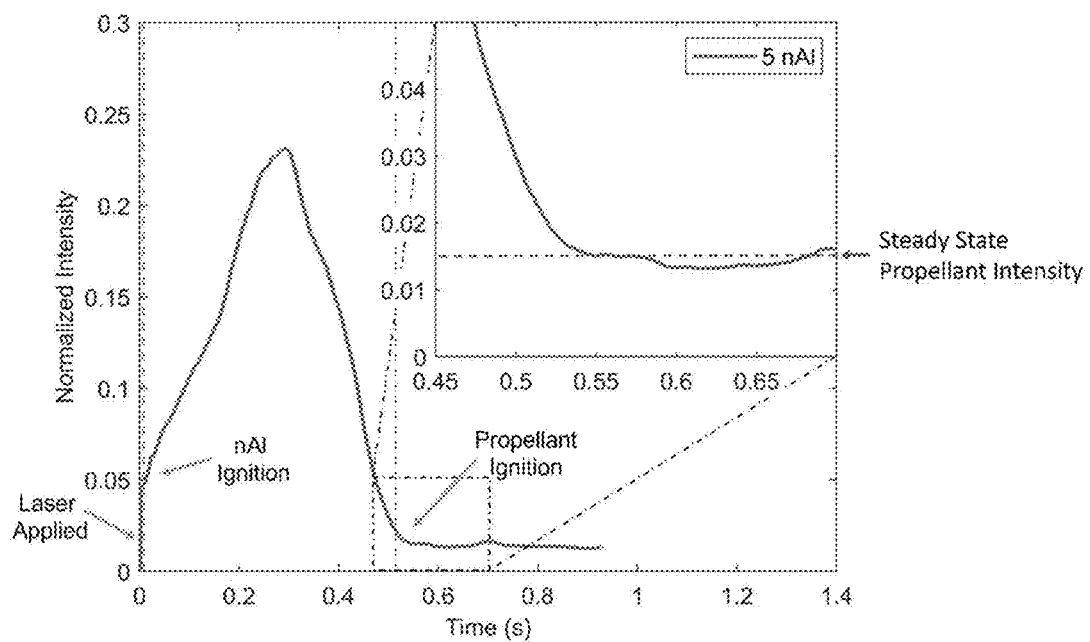
FIG. 20 is a line graph illustrating an intensity trace of a laser ignited propellant sample exhibiting continuous ignition, according to one embodiment of the present disclosure.
Figure 21:
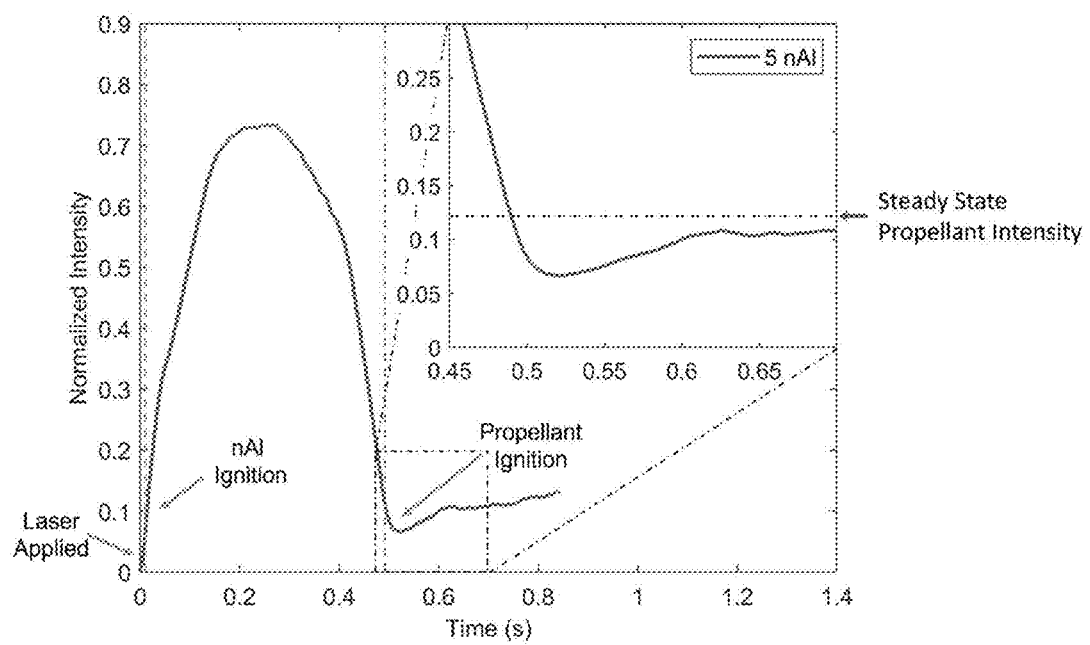
FIG. 21 is a line graph illustrating an intensity trace of a laser ignited propellant sample exhibiting delayed ignition, according to one embodiment of the present disclosure.
Figure 22:
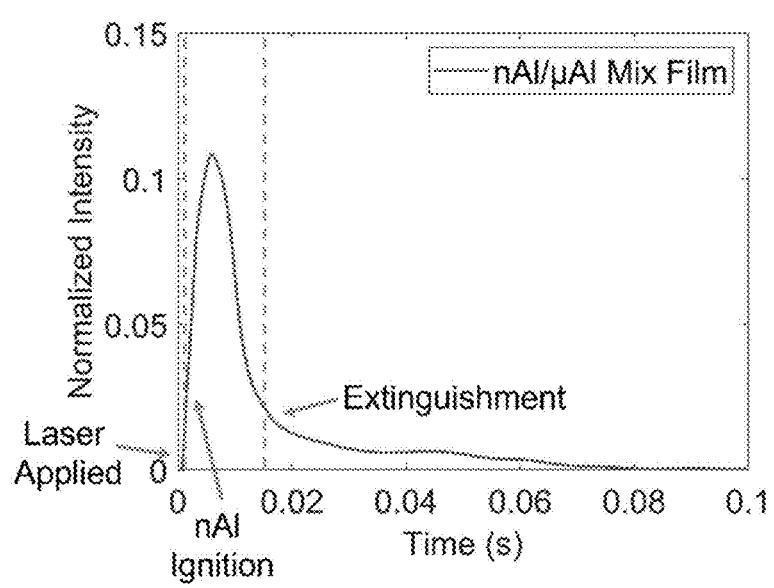
FIG. 22 is a line graph illustrating an intensity trace of a laser ignited propellant sample exhibiting extinguishment, according to one embodiment of the present disclosure.

Unlike flash ignition, the laser light is focused onto the surface and minimal intensity was reflected into the camera. Therefore, as shown in FIGS. 20-22, the first peak indicates the ignition of the igniter composite 104, 106 material. After the consumption of the igniter composite 104, 106 material, the intensity traces of the laser-ignited samples followed similar trends to the flash-ignited samples with continuous ignition indicated by steady intensity values after the aluminized igniter peak, as shown in FIG. 20. The delayed ignition is represented by a decrease and then recovery of intensity, as shown in FIG. 21. The extinguishment is illustrated by a fall to zero, as shown in FIG. 22.

As shown in Table 2, the 1 nAl×1 μAl samples had the lowest total ignition delay of 0.72 seconds for the most consistent transitions between the igniter composite 104, 106 and the propellant 108 of laser-ignited samples. Primarily due to the number of samples with delayed ignition increasing the average total ignition delay time, the laser-ignited 5 nAl samples had shorter delay times than the 1 nAl despite the fewer number of layers.

TABLE 2

Laser ignition delays and propagation modes.

| Igniter Setup | Total Ignition Delay (s) Average | Std Dev | Associated Error per Test (s) | % Continuous Ignition |
|---|---|---|---|---|
| 1 nAl | 0.84 | 0.12 | 0.02 | 10% |
| 5 nAl | 0.61 | 0.05 | 0.02 | 50% |
| 1 nAl × 1 μAl | 0.72 | 0.10 | 0.02 | 100% |
| 1 nAl × 3 μAl | 1.32 | 0.13 | 0.03 | 100% |
| 1 nAl/μAl Mix | 0.54 | 0.05 | 0.02 | 90% |
| nAl/μAl Mix Film | No Propellant Ignition | | | 0% |
| nAl Film | No Propellant Ignition | | | 0% |

A single layer of 75 wt. % nAl was also found to exhibit continuous ignition in 90% of the laser-ignited samples, as compared to 60% of flash-ignited samples. Although the Al/PVDF formulation may be capable of propagating at a rate similar to formulations with only nAl, the size of the Al fuel particles has a critical role in transferring energy from the reaction of the igniter composite 104, 106 to the propellant 108 to produce a continuous ignition. Further, the manner of ignition does not depend solely on slowing down the propagation of the reaction to produce a continuous ignition.

Tests of minimum ignition energy showed a minimum nAl content, such as a critical mass fraction of 0.375, was necessary for initiation of Al/PVDF films of 20 wt. % fuel content. As nAl content is increased, the minimum ignition energy approaches an asymptote. Printed igniter systems 100 may achieve ignition at lower energies due to their increased surface roughness of high amplitude, low frequency surface deviations that worked as a light trap, absorbing more otherwise reflected light, while also forming hotspots.

Films of 20-30 μm thick nAl were unable to ignite AP composite propellant 108 pellets due to their rapid consumption and poor transfer of energy into the underlying propellant 108. Printed igniter systems 100 of ~125 μm and greater thicknesses ignited propellant 108 pellets; however, many exhibited poor energy transfer to the propellant 108 pellets, resulting in delayed ignition of the propellant 108 before recovering to a steady reaction across the entire propellant 108.

Despite its fast consumption, thin layers of nAl material propagated readily to layers of μAl, but often resulted in delayed ignition into the AP composite propellant 108, marked by a dimming of the flame. To get a smoother, more continuous ignition between the igniter composite 104, 106 to the propellant 108, a multi-layered igniter system 100 was utilized. To flash ignite, the first composite layer 118 exposed to the flash bulb needed a critical mass fraction of nAl of around 0.375 to initiate the reaction. Subsequent second composite layer(s) 120 consisting of μAl slowed down the propagation rate and increased the heat transfer to the composite propellant 108. Advantageously, the slower propagation rate and increased heart transfer provided by the subsequent second composite layer(s) 120 of μAl resulted in a steadier, continuous propagation from the igniter composite 104, 106 to the propellant 108. Desirably, fewer μAl second composite layers 120 were necessary when igniting the igniter system 100 with a laser driven system 102 at higher energies.

Another way to quantify the ignition delay is to look at the intensity created during the reaction. The samples dimmed during the ignition period in between the nAl/PVDF igniter composite 104, 106 material and the propellant 108. The trace of the light intensity captured in the high-speed video frames may be used to determine the location of the transfer of the reaction from the igniter composite 104, 106 to the propellant 108. The manner of transfer—continuous ignition, delayed ignition, or extinguishment—can clearly be visualized using the intensity traces. As shown in FIGS. 14 and 21, a dip occurred in the intensity traces between the consumption of the igniter composite 104, 106 material and the propellant 108 before rising to an asymptote indicating a steady state reaction of the propellant 108. The dip aligned with the visibly noticeable dimming in the corresponding image frames, indicating a delayed ignition of the propellant 108. Delayed ignition in both flash and laser ignited materials exhibited the same trend. Continuous ignition was captured in the intensity traces by a steady intensity value following propellant 108 ignition, as shown in FIGS. 16 and 20. Likewise, extinguishment occurred when the intensity traces fell to zero after propellant 108 ignition, as shown in FIGS. 13 and 22.

In a specific instance, when igniting an igniter composite 104, 106 sample with a broadband flash lamp, the bulb was exposed. This led to a saturation or near saturation of the field of view. More specifically, this exposure manifested in an initial spike of saturation as seen in FIGS. 13, 14, and 16. In every ignition event with the flash lamp, the igniter composite 104, 106 began to react as the flash intensity was dying down, making quantification of the delay between triggering the flash and the first light on the igniter composite 104, 106 material difficult through the use of intensity quantification alone. Ignition of the igniter composite 104, 106 was thus determined as the time at which the intensity had fallen to 10% of the highest value of the first peak. Similarly, the propellant 108 ignition would begin as the igniter composite 104, 106 material was consumed and was thus similarly determined at once the intensity had fallen to 10% of the highest value of the second peak. After the second peak, the intensity trace would either continue at a steady value which indicated continuous ignition, decrease in value before rising to an asymptotic steady state which indicated a delayed ignition, or fall to zero which indicated extinguishment.

Unlike flash ignition, laser ignition had a small spot size that minimized intensity reflected into the camera. Therefore, as shown in FIGS. 20, 21, and 22, the first peak was determined as the ignition of the igniter composite 104, 106 material, rather than an indicator of the laser 102. After the consumption of the igniter composite 104, 106 material, the intensity traces follow similar trends to the flash ignited samples with continuous ignition indicated by steady intensity values, delayed ignition by a decrease and then recovery of intensity, and extinguishment by a fall to zero.

Advantageously, the igniter system 100 and methods 200, 300 may enhance the reliability and the consistency of achieving a sustained ignition of a propellant 108. Desirably, the use of a nano-scale aluminum first composite layer 118 and micron-scale aluminum second composite layer 120 provides a steadier and more continuous propagation. Where the igniter composite 104, 106 is provided as a first composite particle 122 disposed within the propellant 108, the propellant 108 may advantageously be ignited directly from the optical energy source 102.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. An igniter system configured to be ignited by an optical energy source emitting a wavelength between around 250 nanometers to around 1100 nanometers, comprising:
    an igniter composite including a reactive component and a fluoropolymer;
    a propellant coupled to the igniter composite; and
    wherein the igniter composite is configured to achieve a sustained ignition with the wavelength between around 250 nanometers to around 1100 nanometers from the optical energy source.

2. The igniter system of claim 1, wherein the reactive component includes at least one of a reactive metal and a metal oxide.

3. The igniter system of claim 2, wherein the reactive component is selected from the group consisting of lithium, boron, sodium, magnesium, aluminum, silicon, calcium, titanium, vanadium, chromium, manganese, iron, cobalt, nickel, copper, zinc, gallium, yttrium, zirconium, niobium, molybdenum, ruthenium, rhodium, palladium, silver, cadmium, indium, tin, antimony, iodine, cesium, barium, hafnium, tantalum, tungsten, platinum, gold, mercury, lead, bismuth, any oxides of the metals, and any combination thereof.

4. The igniter system of claim 3, wherein the reactive component is aluminum.

5. The igniter system of claim 1, wherein the fluoropolymer is selected from the group consisting of PVF (polyvinylfluoride), PVDF (polyvinylidene fluoride), PTFE (polytetrafluoroethylene), PCTFE (polychlorotrifluoroethylene), PFA (perfluoroalkoxy polymer), [P(VDF-TrFE)] (poly (vinylidene fluoride-trifluoroethylene)), [P(VDF-TrFE-CFE)] (poly(vinylidene fluoride-trifluoroethylene-chlorofluoroethylene)), THV (a polymer of tetrafluoroethylene, hexafluoropropylene and vinylidene fluoride), FEP (fluorinated ethylene-propylene), ETFE (polyethylenetetrafluoroethylene), HTE (a polymer of hexafluoropropylene, tetrafluoroethylene and ethylene), ECTFE (polyethylenechlorotrifluoroethylene), FFPM/FFKM (Perfluorinated Elastomer), FPM/FKM (Fluorocarbon [Chlorotrifluoroethylenevinylidene fluoride]), FEPM (Fluoroelastomer [Tetrafluoroethylene-Propylene]), PFPE (Perfluoropolyether), PFSA (Perfluorosulfonic acid), and any combination thereof.

6. The igniter system of claim 1, wherein the fluoropolymer is PVDF.

7. The igniter system of claim 1, wherein the reactive component includes a first reactive component and a second reactive component, the fluoropolymer includes a first fluoropolymer and a second fluoropolymer, and the igniter composite includes:
   a first composite layer having a first composite layer particle including the first reactive component and the first fluoropolymer, wherein the first composite layer particle is a substantially nano-sized particle; and
   a second composite layer having second composite layer particle including the second reactive component and the second fluoropolymer, wherein the second composite layer particle is a substantially micro-sized particle.

8. The igniter system of claim 7, wherein the second composite layer is disposed between the first composite layer and the propellant.

9. The igniter system of claim 7, wherein the total thickness of one of the first composite layer and the second composite layer is at least five hundredths of a millimeter.

10. The igniter system of claim 9, wherein the total thickness of one of the first composite layer and the second composite layer is between five hundredths of a millimeter to five tenths of a millimeter.

11. The igniter system of claim 1, wherein the igniter composite is constructed utilizing additive manufacturing.

12. The igniter system of claim 1, wherein the igniter composite is constructed utilizing tape casting.

13. The igniter system of claim 1, wherein the igniter composite is provided as nano-sized composite particle disposed in the propellant.

14. The igniter system of claim 13, wherein the nano-sized composite particle includes thirty weight percent to fifty weight percent of the reactive component.

15. The igniter system of claim 1, wherein the igniter composite is configured to achieve a sustained ignition with less than thirty joules per square centimeter of energy provided by the optical energy source.

16. The igniter system of claim 15, wherein the igniter composite is configured to achieve a sustained ignition with less than five joules per square centimeter of energy provided by the optical energy source.

* * * * *